(12) United States Patent
Wang et al.

(10) Patent No.: US 12,119,853 B2
(45) Date of Patent: Oct. 15, 2024

(54) DIGITAL CORRECTION TECHNIQUES FOR WIDEBAND RECEIVER SIGNAL CHAIN NONLINEARITIES

(71) Applicant: Analog Devices, Inc., Wilmington, MA (US)

(72) Inventors: Xiao Yu Wang, Watertown, MA (US); Milutin Pajovic, Cambridge, MA (US); Omer Tanovic, Acton, MA (US); Tao Yu, Somerville, MA (US); Nevena Rakuljic, San Diego, CA (US); Gregory Patrick Davis, San Jose, MA (US)

(73) Assignee: Analog Devices, Inc., Wilmington, MA (US)

( * ) Notice: Subject to any disclaimer, the term of this patent is extended or adjusted under 35 U.S.C. 154(b) by 15 days.

(21) Appl. No.: 17/824,899

(22) Filed: May 26, 2022

(65) Prior Publication Data

US 2022/0385318 A1 Dec. 1, 2022

Related U.S. Application Data

(60) Provisional application No. 63/193,065, filed on May 26, 2021.

(51) Int. Cl.
*H04B 1/10* (2006.01)
*H04L 25/03* (2006.01)

(52) U.S. Cl.
CPC ......... *H04B 1/10* (2013.01); *H04L 25/03878* (2013.01)

(58) Field of Classification Search
CPC ............................ H04B 1/10; H04L 25/03878
USPC ......................................................... 375/227
See application file for complete search history.

(56) References Cited

U.S. PATENT DOCUMENTS

| | | | |
|---|---|---|---|
| 9,160,310 B2 | 10/2015 | Velazquez et al. | |
| 9,564,876 B2 | 2/2017 | Kim et al. | |
| 10,666,307 B2 | 5/2020 | Wang | |
| 2006/0133470 A1* | 6/2006 | Raz .................... | H03H 21/0016 375/232 |

(Continued)

OTHER PUBLICATIONS

Bolstad, Andrew, "Sparse Polynomial Equalization of an RF Receiver via Algorithm, Analog, and Digital Codesign", 46th Asilomar Conference on Signals, Systems and Computers (Asilomar), IEEE, (2012), 1102-1106.

(Continued)

*Primary Examiner* — Leila Malek
(74) *Attorney, Agent, or Firm* — Schwegman Lundberg & Woessner, P.A.

(57) ABSTRACT

Non-idealities of input circuitry of a receiver signal chain can significantly degrade the overall performance of the receiver signal chain. A digital nonlinearity correction (NLC) can be implemented in a receiver signal chain having an ADC. Digital NLC can be designed as a drop in signal preconditioner for existing RF ADC wideband receiver signal chains. A unique equalizer can compensate for a variety of mixer spurs. Accordingly, digital NLC can correct nonlinearities due to mixers and any amplifiers preceding or following the ADC, potentially improving receive chains performance by 15-25 dB. Such a digital NLC solution can be particularly beneficial in defense and instrumentation applications which demand the greatest performance.

16 Claims, 16 Drawing Sheets

(56) References Cited

U.S. PATENT DOCUMENTS

| | | | | |
|---|---|---|---|---|
| 2011/0095819 A1* | 4/2011 | Velazquez | ............ | H03F 1/3247 |
| | | | | 330/149 |
| 2012/0086504 A1* | 4/2012 | Tsukamoto | .......... | H04B 1/0028 |
| | | | | 327/551 |
| 2015/0369898 A1* | 12/2015 | Torin | ..................... | G01R 31/28 |
| | | | | 324/750.02 |
| 2016/0191020 A1* | 6/2016 | Velazquez | ............... | H04L 25/02 |
| | | | | 341/118 |
| 2019/0028131 A1* | 1/2019 | Wang | ....................... | H04B 1/10 |
| 2019/0312571 A1* | 10/2019 | Hovakimyan | ...... | H03M 1/0614 |

OTHER PUBLICATIONS

Grimm, Michael, "Joint Mitigation of Nonlinear RF and Baseband Distortions in Wideband Direct-Conversion Receivers", IEEE Transactions on Microwave Theory and Techniques, 62(1), (Jan. 2014), 166-182.

Valkama, Mikko, "Advanced Digital Signal Processing Techniques for Compensation of Nonlinear Distortion in Wideband Multicarrier Radio Receivers", IEEE Transactions on Microwave Theory and Techniques, 54(6), (Jun. 2006), 2356-2366.

Wambacq, P., "Chapter 4: Volterra series and their applications to analog integrated circuit design", in Distortion Analysis of Analog Integrated Circuits, Springer Science+Business Media New York, (1998), 59 pgs.

\* cited by examiner

- Cast this problem as a $L^2$ nonlinear optimization problem
- What is known:
  - vector $\underline{y}$ of observations of the NLTF, of length $N_k$ corresponding to set of observation points $(\underline{\Omega}_1, \underline{\Omega}_2, \underline{\Omega}_3)$
  - Vector $\underline{h}$ of filter unknown coefficients, of length $N_c$, either real or complex domain
  - A nonlinear function $f_{3,(\underline{\Omega}_1,\underline{\Omega}_2,\underline{\Omega}_3)}(\underline{h}, \underline{h}^*)$ or $f_{3,(\underline{\Omega}_1,\underline{\Omega}_2,\underline{\Omega}_3)}(\underline{h})$ which generates NLTF response $\underline{\tilde{H}}_3[\underline{\Omega}_1, \underline{\Omega}_2, \underline{\Omega}_3]$
- Minimize:

$$\epsilon = \underline{\epsilon}_c^H \underline{\epsilon}_c \quad \underline{\epsilon}_c \equiv \underline{y} - k\, \underline{f}_{3,(\underline{\Omega}_1,\underline{\Omega}_2,\underline{\Omega}_3)}(\underline{h}, \underline{h}^*)$$

$$\underline{h} = [\underline{h}_w^T, \underline{h}_1^T, \underline{h}_2^T, \underline{h}_3^T, \underline{h}_4^T, \underline{h}_f^T]^T \in \mathbb{C}^{N_w+N_1+N_2+N_3+N_4+N_f=N_c} \text{ or } \mathbb{R}^{N_c}\, P_{\tilde{h}_i,\underline{\Omega}_j}^*: N_i \times N_k \text{ tensor (matrix)}$$

$$(\underline{\Omega}_1, \underline{\Omega}_2, \underline{\Omega}_3) \in \mathbb{C}^{N_k}$$

Optimization Problem is complex non-holomorphic in baseband

FIGURE 11

# DIGITAL CORRECTION TECHNIQUES FOR WIDEBAND RECEIVER SIGNAL CHAIN NONLINEARITIES

PRIORITY APPLICATION

This patent application receives benefit from and claims priority to US provisional application having the same title as this patent application, with Ser. No. 63/193,065, filed on May 26, 2021. The US provisional application is hereby incorporated by reference in its entirety.

FIELD OF THE DISCLOSURE

The present invention relates to the field of integrated circuits, in particular to receiver signal chains including mixers and digital correction techniques for said receiver signal chains.

BACKGROUND

In many electronics applications, an analog input signal is converted to a digital output signal (e.g., for further digital signal processing). For instance, an antenna generates an analog signal based on the electromagnetic waves carrying information/signals in the air. The analog signal generated by the antenna is then provided as input to an analog-to-digital converter (ADC) to generate a digital output signal for further processing.

ADCs convert a continuous physical quantity that is also known as an analog signal to a digital signal whose values represent the quantity's amplitude (or to a digital signal carrying that digital number). One critical limitation to the performance of an ADC is the linearity of the overall system, or the linearity of the receiver signal chain. Linearity can, for example, affect the signal-to-noise-and-distortion ratio (SINAD) and spurious free dynamic range (SFDR). In some cases, circuit designers achieve better linearity at the cost of implementing more complex and/or power hungry circuit designs, especially for the circuits which drive the ADC.

Systems for addressing non-idealities in the components in front of the ADC are not always sufficiently flexible for high performance wideband receiver signal chains.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 11 illustrates the nonlinear optimization problem, according to some embodiments of the disclosure;

DETAILED DESCRIPTION OF THE DRAWINGS

Overview

Non-idealities of input circuitry of a receiver signal chain can significantly degrade the overall performance of the receiver signal chain. A digital nonlinearity correction (NLC) can be implemented in a receiver signal chain having an ADC. Digital NLC can be designed as a drop in signal preconditioner for existing RF ADC wideband receiver signal chains. A unique equalizer can compensate for a variety of mixer spurs. Accordingly, digital NLC can correct nonlinearities due to mixers and any amplifiers preceding or following the ADC, potentially improving receive chains performance by 15-25 dB. Such a digital NLC solution can be particularly beneficial in defense and instrumentation applications which demand the greatest performance.

Exceptional Requirements in Certain Applications

The aerospace and defense (ADEF) and electronic test and measurement (ETM) markets are high margin businesses that demand RF receive chains with the highest performance. In recent years, innovations in ADCs have enabled receiver systems with instantaneous bandwidths (IBW) well in excess of 1 GHz. Many of such receiver systems aim to have many-octave tuned or stacked receive systems.

In heterodyne systems, careful frequency planning is used when linearity is a concern. Specifically, high linearity is achieved by various filters in the receive chain that filter or eliminate spurs which are intentionally placed at certain frequencies according to the frequency plan. As tuning range and IBW increase, this frequency planning becomes less effective because previously ignored spur products such as second order intermodulation distortion products (IMD2) become significant in multi-octave designs. Additionally, third order intermodulation distortion products (IMD3) spurs can be significant for any frequency plan and further pose a challenge when higher linearity is desired.

The combination of the desire for wide tuning range and multi-GHz IBW motivates the development of a digital NLC solution involving a receiver signal chain equalizer that can alleviate the constraints of frequency planning. The equalizer has a unique filter structure can compensate for a variety of mixer spur products that arise. Digital NLC enables a new degree of freedom in receiver signal chain frequency planning that was previously unavailable in high performance systems. Furthermore, system design for wideband high performance receiver signal chains is made easier with digital NLC.

Physical Causes of Spurs in RF Receiver Signal Chains

Figure 1:
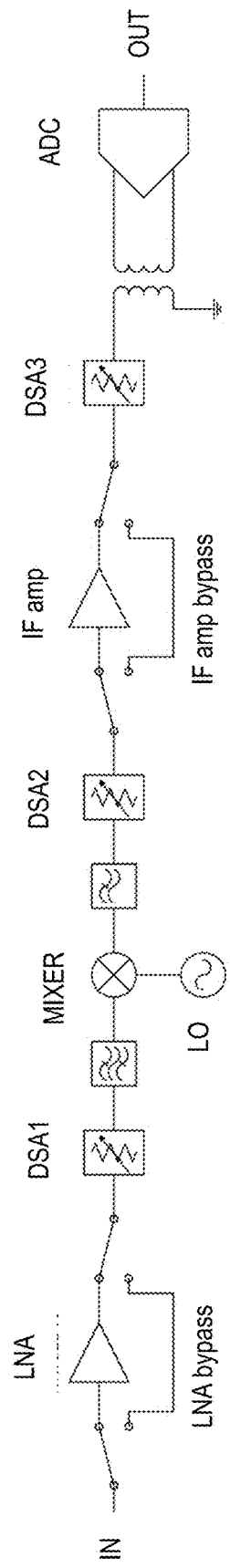
FIG. 1 illustrates an exemplary radio frequency (RF) signal chain, according to some embodiments of the disclosure.
Figure 2:
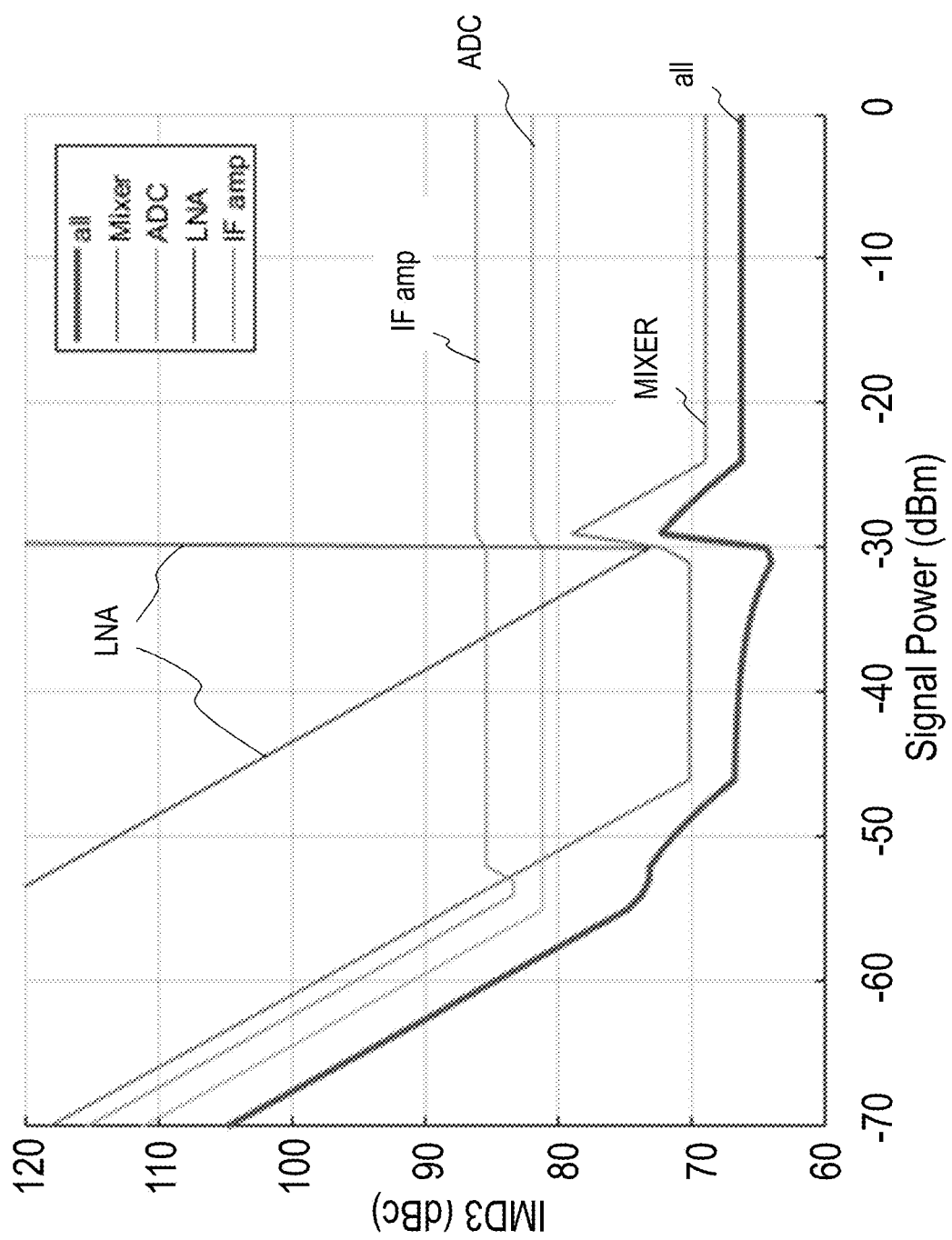
FIG. 2 illustrates contribution from various components in the RF signal chain, according to some embodiments of the disclosure.

Nonlinear spurs in receivers are due to the nonlinearity of components within the receiver front end throughout the signal chain. These components can include the low noise amplifier (LNA), mixer, IF/baseband driver amplifier, and sample and hold of the ADC. The contributions of these components are illustrated using the exemplary ETM receiver chain shown in FIG. 1. FIG. 2 shows a plot of the contributions to receiver IMD3 from various components in the receiver signal chain for optimally chosen attenuation settings for a given input power while maintaining full scale at the ADC input. Mixer can dominate full signal chain nonlinearity. Even with a perfectly linear mixer, other components can limit performance to below 80-90 dBc target. The conclusion of this analysis is that LNA, mixer and IF/baseband equalization can help to achieve aggressive linearity targets of >90 dB. Linearizing the entire receiver signal chain can greatly improve linearity.

Equalization Approach

Figure 3:
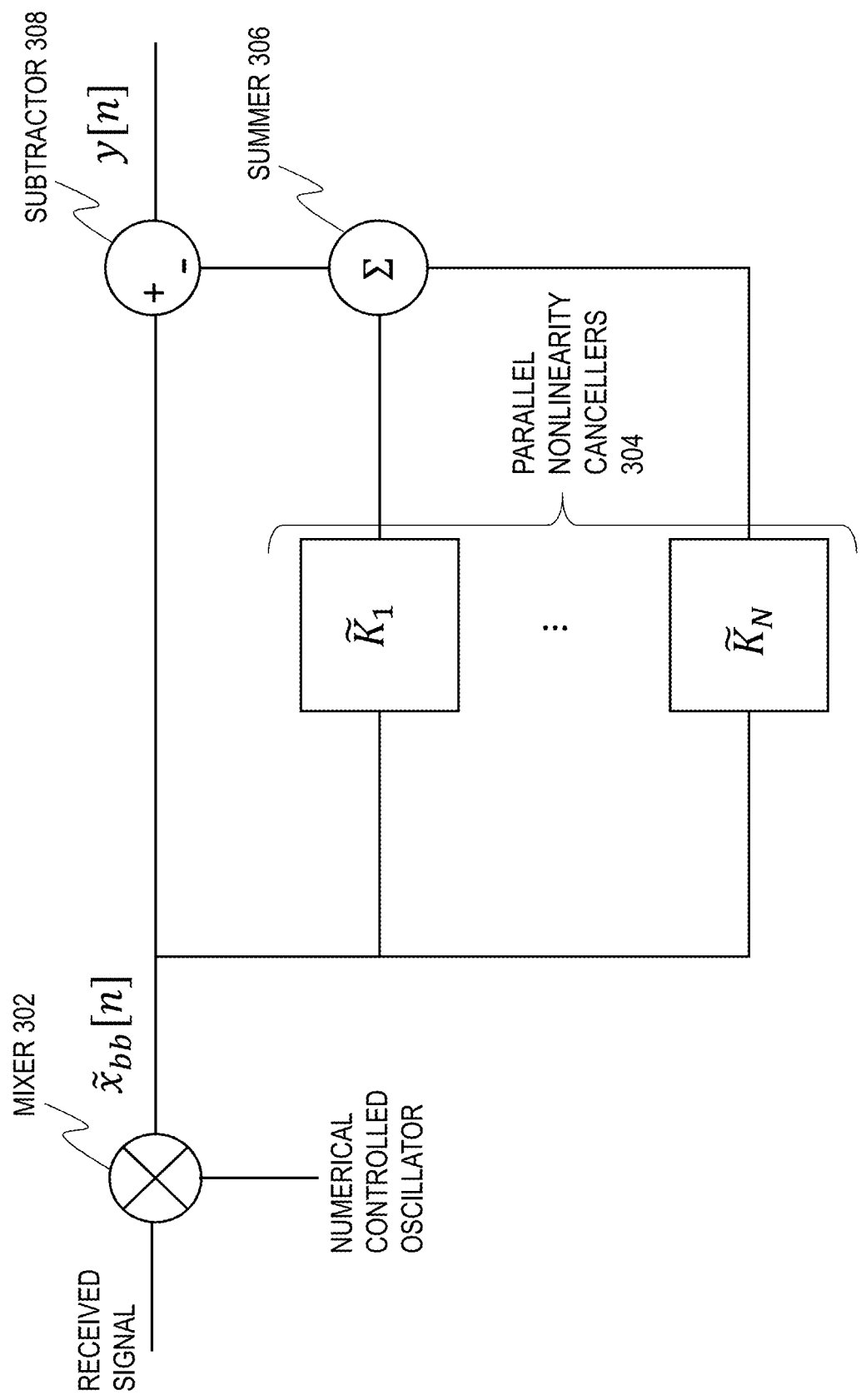
FIG. 3 illustrates an exemplary signal chain nonlinearity correction system having parallel nonlinearity cancellers, according to some embodiments of the disclosure.

The high-level block diagram of a system-level NLC capability is shown in FIG. 3. Mixer systems may be compensated in-digital by the parallel branch structure in FIG. 3, where each $K_1, \ldots K_n$ (i.e., the parallel branches) is a complex-valued baseband time-invariant (polynomial) nonlinearity canceller for a specific class of nonlinearity. For example, branches can be provided, where a given branch is provisioned to compensate or cancel for second order intermodulation product (IM2), third order intermodulation product (IM3), second harmonic distortion (HD2), third harmonic distortion (HD3), etc.

The NLC block takes the received signal from the output of an ADC in a receiver signal chain. A mixer 302 can mix the (digital) received signal with an output from a numerically controlled oscillator (NCO). The mixer converts the received signal, i.e., a real passband signal, into a complex baseband signal (i.e., into the complex domain). The output from the mixer, a complex baseband signal $\tilde{x}_{bb}[n]$, is processed by parallel branches 304, $\tilde{K}_1 \ldots \tilde{K}_N$. The branches are also referred to artificial nonlinearity generators. The outputs of the different artificial nonlinearity generators are combined/summed by a summer 306 to generate the set of compensating spurs that serve to linearize the received signal. The summed outputs from the parallel generators are subtracted, by subtractor 308, from the output of the mixer to obtain the corrected received signal.

Specifications for the generators forming the NLC block (e.g., each generator having a network of memoryless function-filter cascades) can be obtained by probing the receiver signal chain using a multi-tone frequency probing method (e.g., three tone frequency probing method) and observing the output of the receiver signal chain (i.e., the output of the ADC). The observation yields a nonlinear transfer function (NLTF) measurement that can provide information for programming or synthesizing each of the generators $\tilde{K}_1 \ldots \tilde{K}_N$. With properly programmed/synthesized generators, an appropriate NLTF can be synthesized in the equalizer to cancel spurs throughout a three-dimensional cube of its frequency response. The equalizer can generalize to any wideband input for systems of third order or less.

Using three or more tones as the probe signal can elicit a combination of spurs at the output of the ADC in the receiver signal chain. The more tones being used as the probe signal, a higher combination of spurs can be found at the output. Having a higher combination of spurs can provide more information on the nonlinearity of the receiver signal chain (which in turn help synthesize the generators), at the expense of higher complexity for the probe signal.

Selecting and designing generators for the NLC block is not trivial. Use of the NLTF characterization reveals that certain modes of nonlinear frequency dependence cannot be adequately captured by generalized memory polynomial (GMP) or Hammerstein models that are often used for receiver compensation. In order to more robustly capture this frequency dependence, a complex baseband equalizer implements cascades of operation/function-filter paths, which form the individual $K_1 \ldots K_N$ responses corresponding to different classes of nonlinearities. The complex baseband cascade model (CBCM) equalizer allows a rich variety of modes of nonlinear frequency dependence to be synthesized while having a low number of parameters relative to a full Volterra model, which are difficult to implement in hardware due to their notorious complexity.

Figure 4:
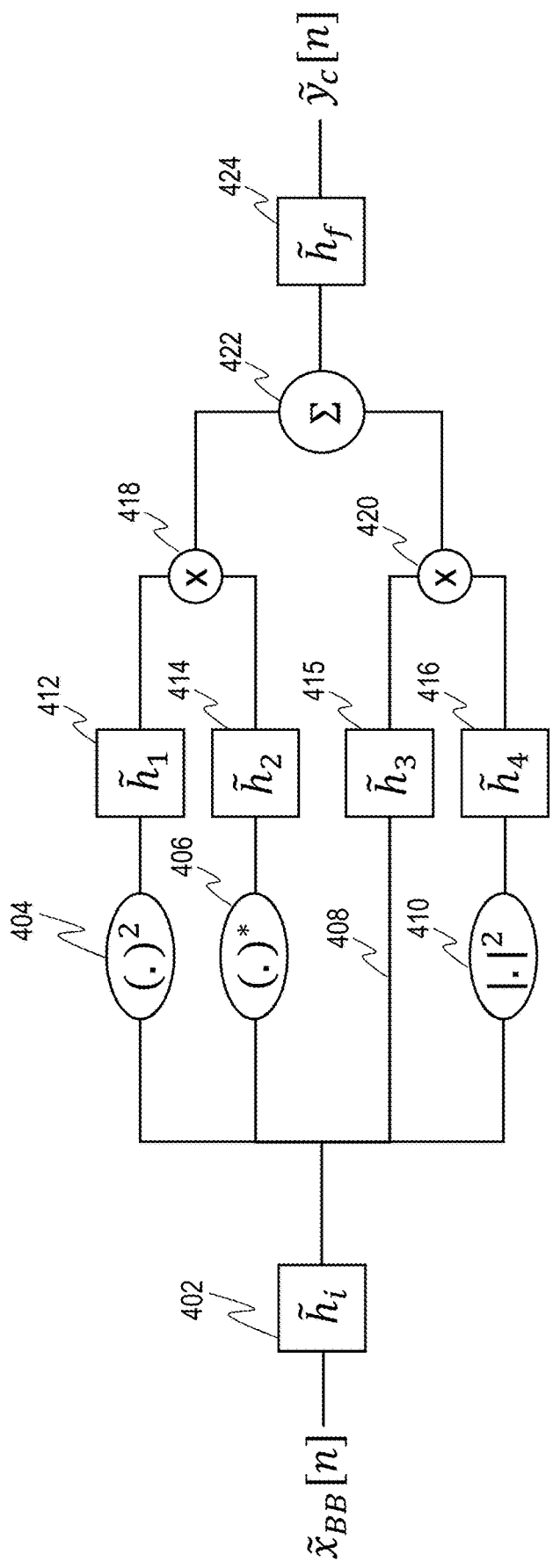
FIG. 4 illustrates an exemplary complex baseband equalizer, according to some embodiments of the disclosure.

FIG. 4 illustrates one exemplary filter structure for a generator. Specifically, an example of a CBCM for IM3 is shown in FIG. 4. Identification of this model requires nonlinear methods in the parameters and can either be done through, e.g., gradient descent or Newton's method for nonlinear least squares solving. The equalizer includes a first filter 402 ($\tilde{h}_i$), which can be a linear filter filtering the complex baseband signal $\tilde{x}_{bb}[n]$. The output of the first filter 402 can be processed by parallel paths (i.e., parallel cascades of function-filter paths). A suitable network of operations can combine the outputs of the parallel paths. A first path processing the output of the first filter 402 includes a first function 404 and a second linear filter 412 ($\tilde{h}_1$). The first function can include a squaring function (($\cdot$)$^2$). A second path processing the output of the first filter 402 includes a second function 406 and a third linear filter 414 ($\tilde{h}_2$). The second function can include a conjugate function (($\cdot$)*). Outputs of the first path and the second path can be multiplied together by multiplier 418. A third path processing the output of the first filter 402 includes a third function 408 and a fourth linear filter 415 ($\tilde{h}_3$). The third function can include a unity function (equivalent to no operation applied or a pass through operation). A fourth path processing the output of the first filter 402 includes a fourth function 410 and a fifth linear filter 416 ($\tilde{h}_4$). The fourth function can include an absolute value function and a squaring function applied to the absolute value. Outputs of the third path and the fourth path can be multiplied together by multiplier 420. Outputs of multipliers 418 and 420 are summed by summer 422. Output of summer 422 is filtered by a fifth linear filter 424 ($\tilde{h}_f$) to generate a nonlinearity $\tilde{y}_c[n]$.

Upsampling and Filtering Considerations for NLC

Figure 5A:
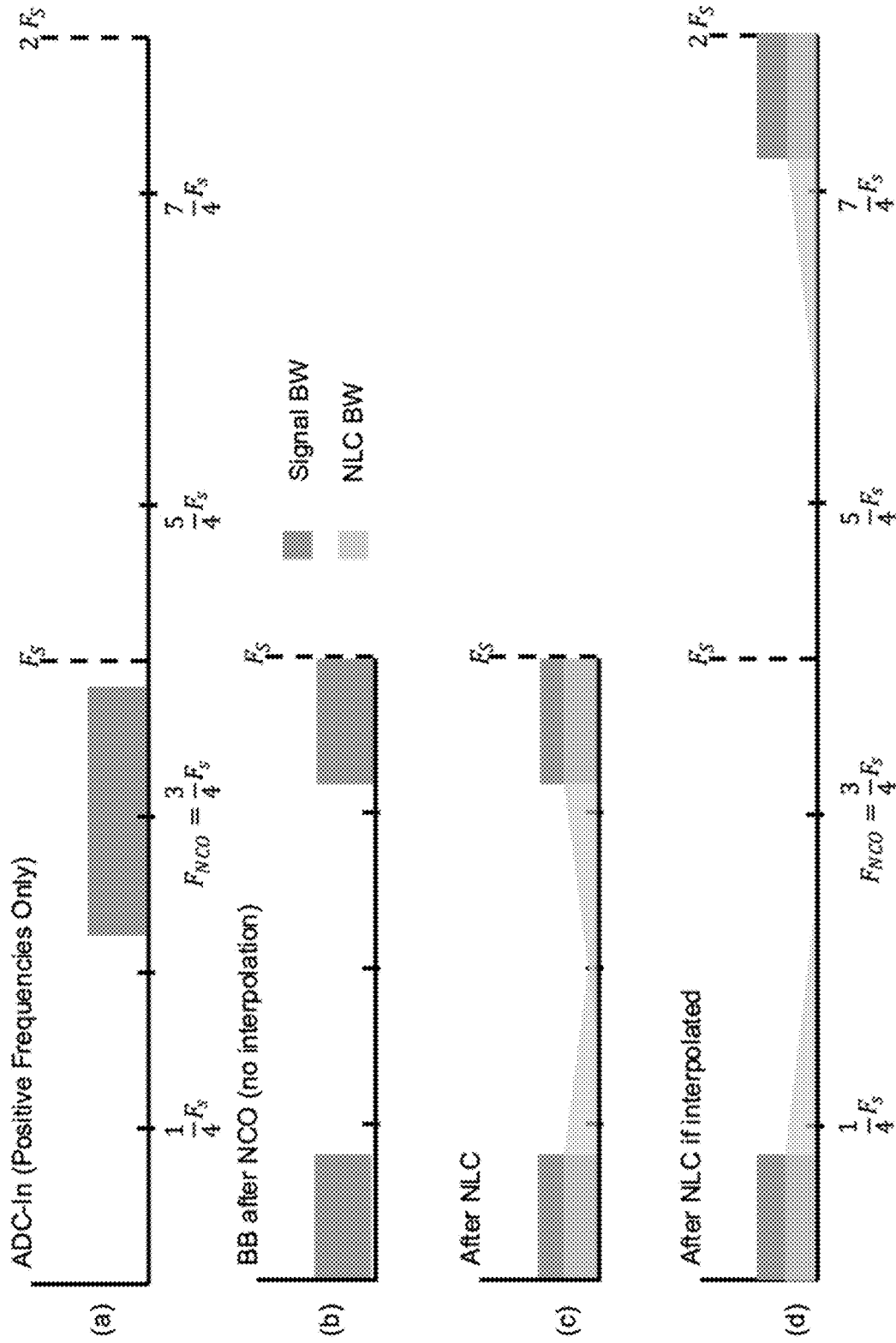
FIG. 5A illustrates upsampling requirement for signal chain nonlinearity cancellation, according to some embodiments of the disclosure.

Since the CBCM equalizer relies on cascades of linear filter following a function/operation, the input data stream (the received signal from the output of the ADC in the receiver signal chain) is upsampled and interpolated to a sufficient rate before passing through the equalizer. The nonlinear operations bandwidth-expand the input data stream. Bandwidth expansion is illustrated in FIG. 5A, specifically FIG. 5A(b). Therefore, for sufficiently wide input bandwidths, the bandwidth-expanded signal may cross a Fs/2 (Fs is the sampling frequency of the ADC in the receiver signal chain) boundary and overlap, thereby causing a situation where the filter response cannot be uniquely specified for spur products that map to the same frequency bin (or Fast Fourier Transform (FFT) bin), as illustrated in FIG. 5A(c). In order to avoid this issue, the input can be upsampled and interpolated (e.g., as shown in FIG. 5(d)) allowing the CBCM to generate a unique response for all spur output frequencies.

For the CBCM equalizer and third order nonlinearities, a processing rate of at least 3 $F_{BW}$ is preferred, where $F_{BW}$ is the bandwidth of the signal. For practical reasons, upsampling of 4 can be performed. Interpolation is also preferably implemented for $F_{BW} > F_s/3$. Additionally, since $F_{BW} < F_s/2$, for third order nonlinearities, interpolation by two is sufficient for the CBCM model. In some cases, interpolation by bandpassing the upsampled signal according to the second Nyquist band is performed.

After the received signal passes through the CBCM equalizer block, the output of the CBCM equalizer block is filtered to remove out-of-band compensating spurs that correspond to spur frequencies that are physically filtered out by filters in the receive chain. If desired, the output of the NLC can then be further decimated to match the rate of the received signal.

Figure 5B:
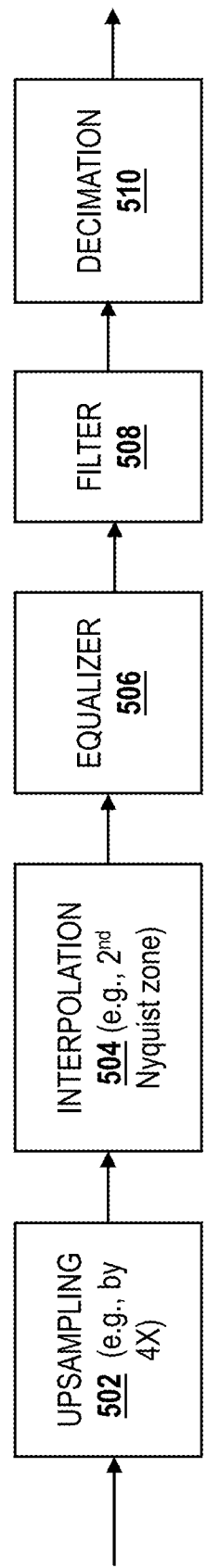
FIG. 5B illustrates upsampling, interpolation, signal chain nonlinearity cancellation, and decimation, according to some embodiments of the disclosure.

FIG. 5B illustrates the operations performed prior to the equalizer and downstream to the equalizer. Operations can be applied to a received signal, e.g., a real passband signal or a complex baseband signal. The received signal is upsampled by upsampling 502. The upsampled signal is interpolated by interpolation 504. The interpolated signal is processed by an equalizer 506. The output of the equalizer 506 is filtered to remove out-of-band compensating spurs. The output of the filter 508 is then decimated by decimation 510.

System Architecture

Figure 6:
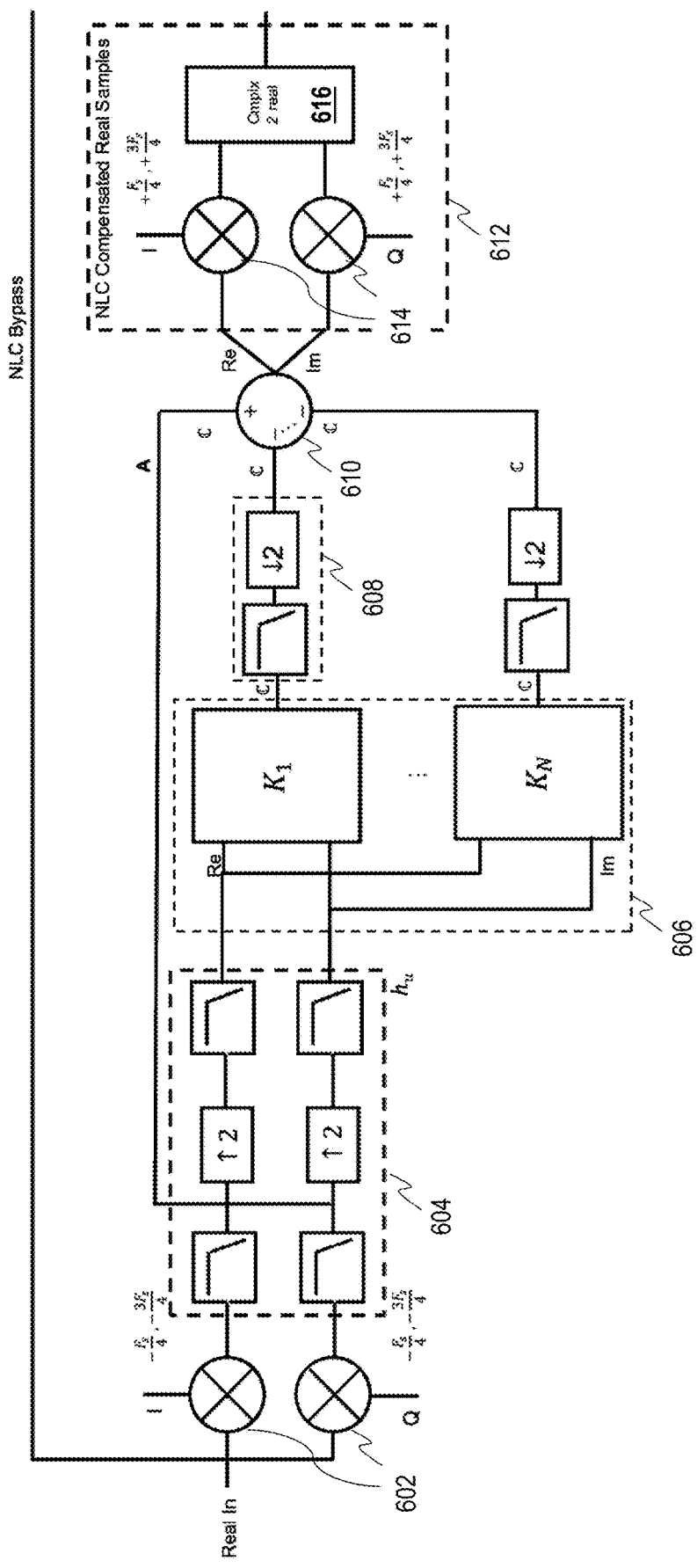
FIG. 6 illustrates an exemplary drop in block for signal chain nonlinearity cancellation, according to some embodiments of the disclosure.

Digital NLC solution is shown in FIG. 6 as a drop in block at the output of RF ADC of a receiver signal chain. The NLC system architecture operates on a real data stream ("Real In"), frequency converting the data stream into a complex baseband signal. To do so, the mixers 602 mixes the real data stream using a signal having a frequency of $-F_s/4$ or $-3 F_s/4$. The signal is then low pass filtered and optionally upsampled and interpolated based on the considerations of the previous section (box 604). At this point, the complex baseband signal is put through N parallel branches 606 of NLC compensators/equalizers ($K_1 \ldots K_N$) whose output are low pass filtered and decimated (e.g., box 608) before being recombined with the input data stream (a complex baseband signal) provided by path A. The artificially generated nonlinearities output from the N parallel branches 606 are subtracted from the received signal by subtractor 610, thereby yielding to a compensated/corrected complex baseband stream at the output of the subtractor 610. The complex baseband signal is then upconverted and converted into a real signal (box 612). One of mixers 614 mixes the real part of the complex bandband signal using a signal having a frequency of $+F_s/4$ or $+3 F_s/4$. The other one of mixer 614 mixes the imaginary part of the complex bandband signal using a signal having a frequency of $+F_s/4$ or $+3 F_s/4$. The outputs of the mixers 614 are converted from a complex signal into a real signal by converter 616. This output (i.e., the real signal) is a NLC compensated real data stream with spurs attenuated inside the bandwidth of the signal.

Since the output of NLC block is in the same form as the original ADC data stream, any existing blocks such as NCOs, digital down converters (DDCs), and high performance decimation filters can be kept unchanged to be subsequently used on the NLC compensated data stream.

Exemplary Systems

Figure 7:
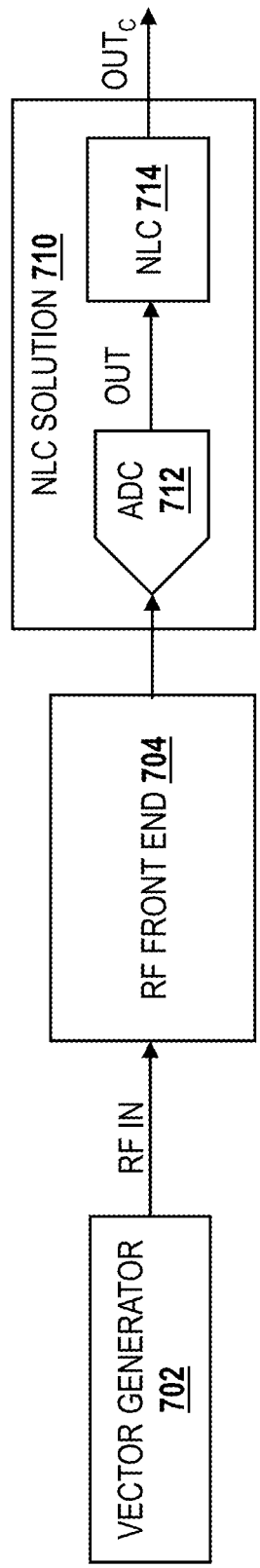
FIG. 7 illustrates an exemplary RF system with signal chain nonlinearity cancellation, according to some embodiments of the disclosure.

The NLC solution is implemented and tested based on a system illustrated in FIG. 7. The system includes a vector generator 702 to generate a probe signal, which can be a multi-tone signal centered within the bandwidth of the RF front end 704 (e.g., the components upstream of ADC 712). The probe signal (e.g., a three tone probe signal) can be injected in the RF front end 704. The ADC 712 can generate a digital output, which can be used as the measurement vector for synthesizing filters in NLC 714. The NLC 714 can then be used to filter output of ADC 712 to provide digital nonlinearity cancellation.

A set of three tone data captures within the bandwidth of 27.1-28.1 GHz was used to measure the NLTF and a third order CBCM was fit to the extracted NLTF data. Observation of spur compensation as cumulative distribution curves for a range of compensator complexity reveal an improvement of 24 dB for the 48-tap equalizer. The number of taps is the aggregate number of finite impulse response (FIR) filter elements in the CBCM.

Another example implementation of spur compensation with widely spaced three tone inputs using a 48-tap equalizer trained with data across the entire 1 GHz bandwidth reveals that targeted spurs are almost to the noise floor, showing the effectiveness of cascade equalizer in synthesizing a desirable wideband compensating response.

Figure 8A:
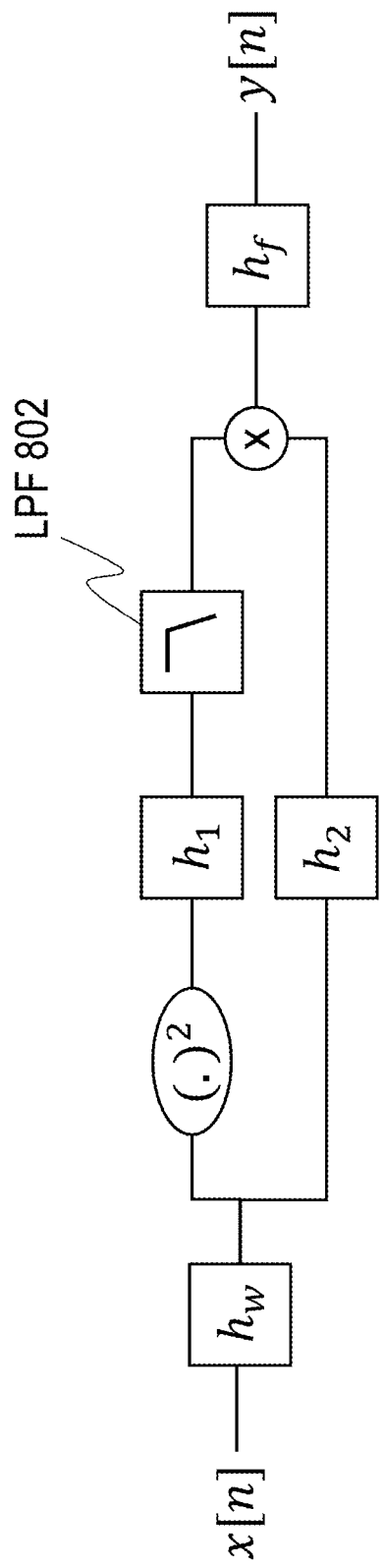
FIGS. 8A-B illustrate applying a low pass filter to reject HD3, according to some embodiments of the disclosure.
Figure 8B:
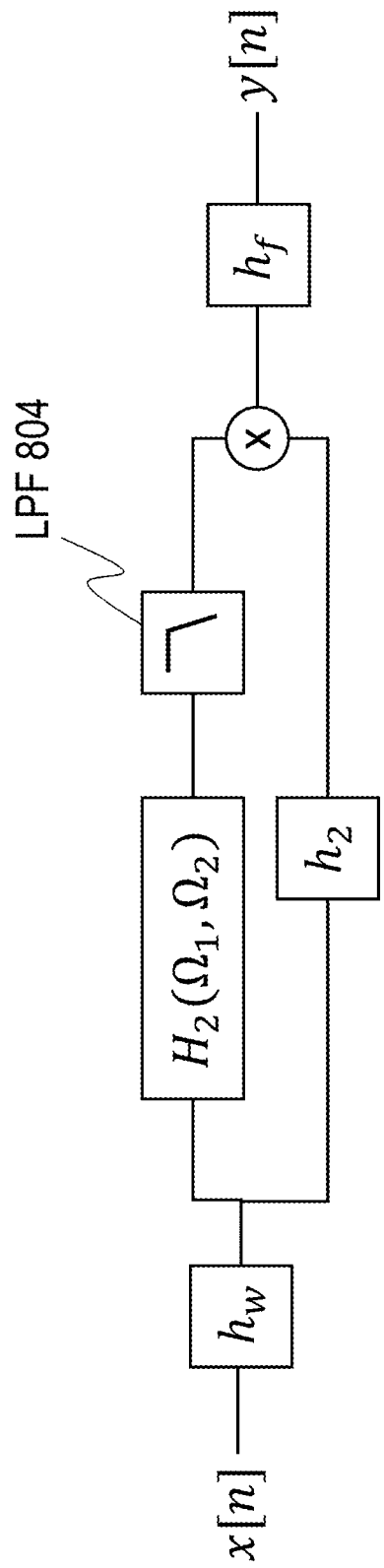

Adding a Low Pass Filter to Suppress HD3 Tones Artificially Generated by the Equalizer FIGS. 8A-B show improved equalizer structures, with a low pass filter (LPF) 802 added to the $(\cdot)^2$ path at the output of $h_1$, or an LPF 804 added in any path addressing a second order nonlinearity in the equalizer, at the output of $H_2$ ($\Omega_1$, $\Omega_2$). Cut off frequency can be at ½ Nyquist. Such LPF filter can suppress HD3 tones which are artificially generated by the $(\cdot)^2$ path (or second order nonlinearity path) due to the squaring operation.

Adding a Band Pass Filter to Reject Images

NLC can work for systems in the first or second Nyquist zone with signal bandwidth:

Up to 80% of $$\frac{F_s}{2},$$

when using 4× interpolation
Up to 80% of $$\frac{F_s}{4},$$

no interpolation

For signal chains with mixers, linearizable bandwidth is centered at $$\frac{F_s}{4}$$

(first Nyquist zone) or $$3\frac{F_s}{4}$$

Figure 9:
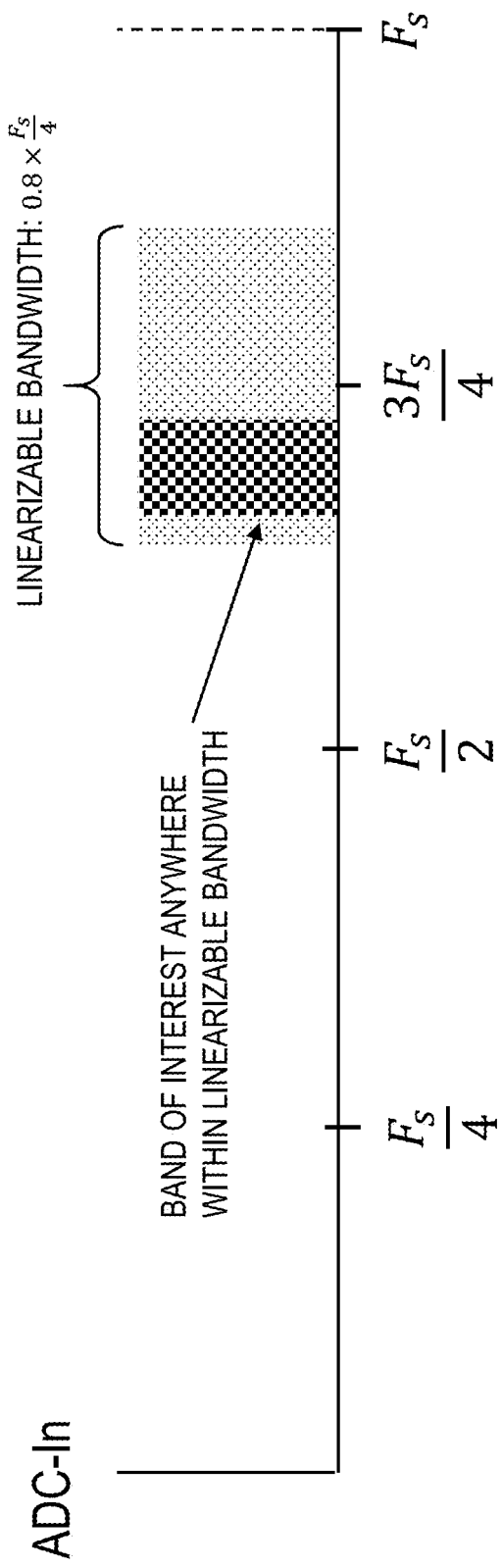
FIG. 9 illustrates linearizable bandwidth, according to some embodiments of the disclosure.

(second Nyquist zone). Any part of the bandwidth can be used by NLC. FIG. 9 illustrates the linearizable bandwidth centered at second Nyquist zone. Distortion that falls into the linearizable band is suppressed. Distortion outside of the linearizable band may be uncorrected or even slightly enlarged.

Figure 10:
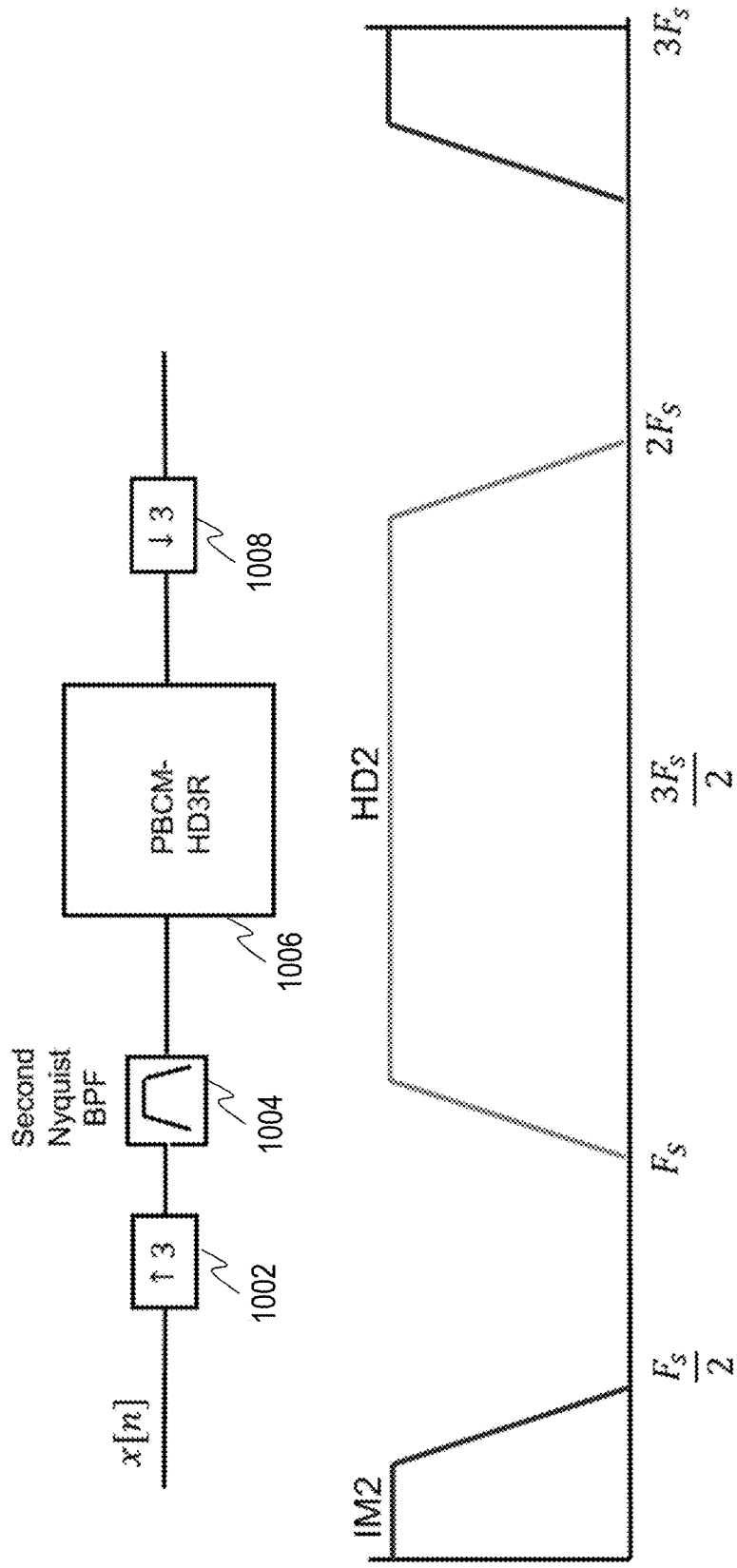
FIG. 10 illustrates applying a bandpass filter after upsampling, according to some embodiments of the disclosure.

FIG. 10 shows an improved equalizer structure, with bandpass filter 1004 added after upsampling in a HD3 equalizer path. After upsampling by upsampler 1002 (e.g., upsampling by 3), a bandpass filter 1004 filters the signal. The frequency band passed by the bandpass filter 1004 corresponds to the second Nyquist zone. The bandpass filter serves as an image rejection filter and selects the second Nyquist zone when performing HD3 cancellation (e.g., by passband equalizer 1006). The output of the passband equalizer 1006 is decimated by decimator 1008 (e.g., decimation by 3).

Synthesizing the Equalizers

Figure 12:
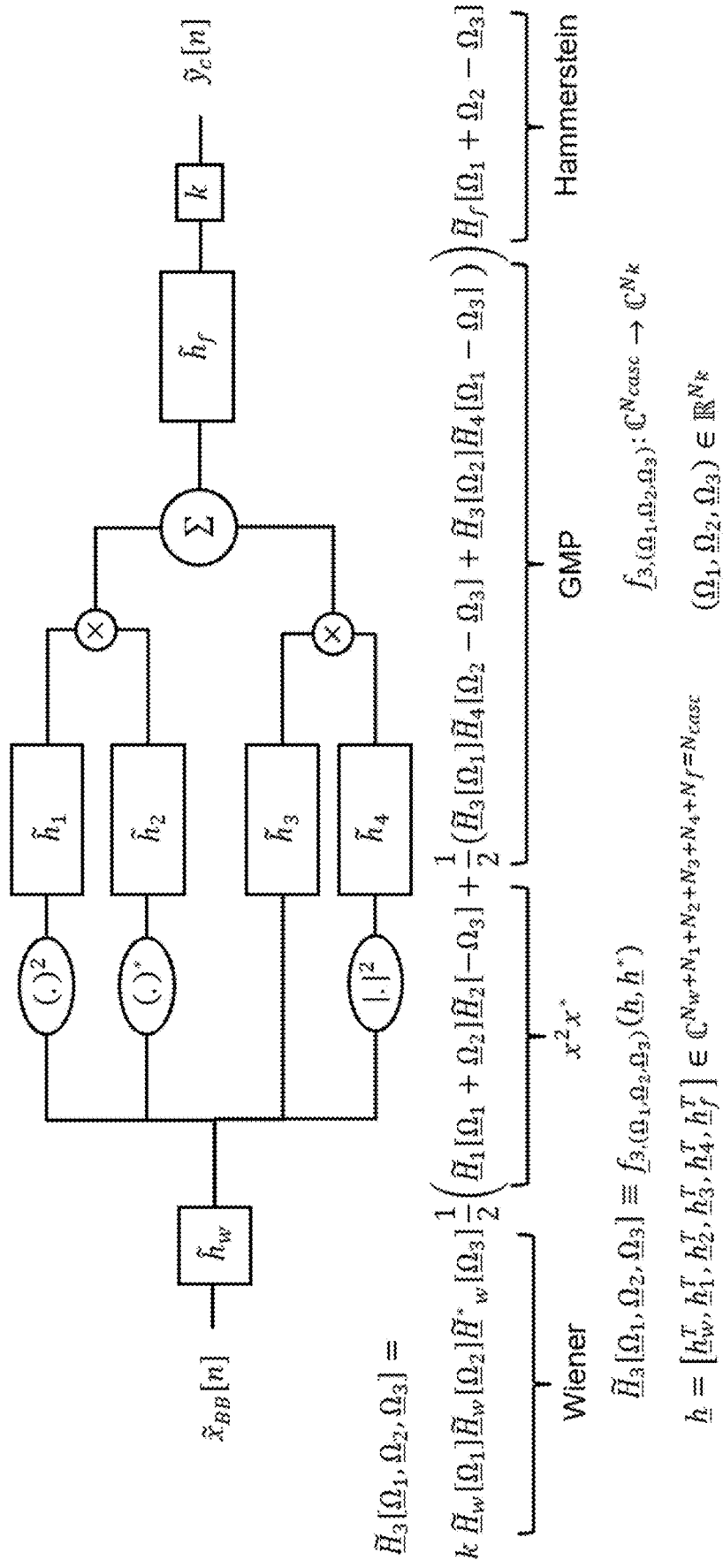
FIG. 12 illustrates analytical nonlinear transfer function of an exemplary complex baseband equalizer, according to some embodiments of the disclosure.

As discussed previously, using the complex baseband equalizers makes it practical to implement in a receiver because the number of parameters is far fewer than a Volterra kernel. FIG. 11 shows one exemplary setup for the $L^2$ optimization problem that can be solved to synthesize the linear filters in a complex baseband equalizer (e.g., such as the one shown in FIG. 4). FIG. 12 shows the NLTF response for the complex baseband equalizer. Note that the NLTF response is able to compensate for nonlinearities beyond the GMP model, and the Hammerstein model.

Passband Cascade Equalizer Equivalent to Complex Baseband Cascade Equalizer

Figure 13:
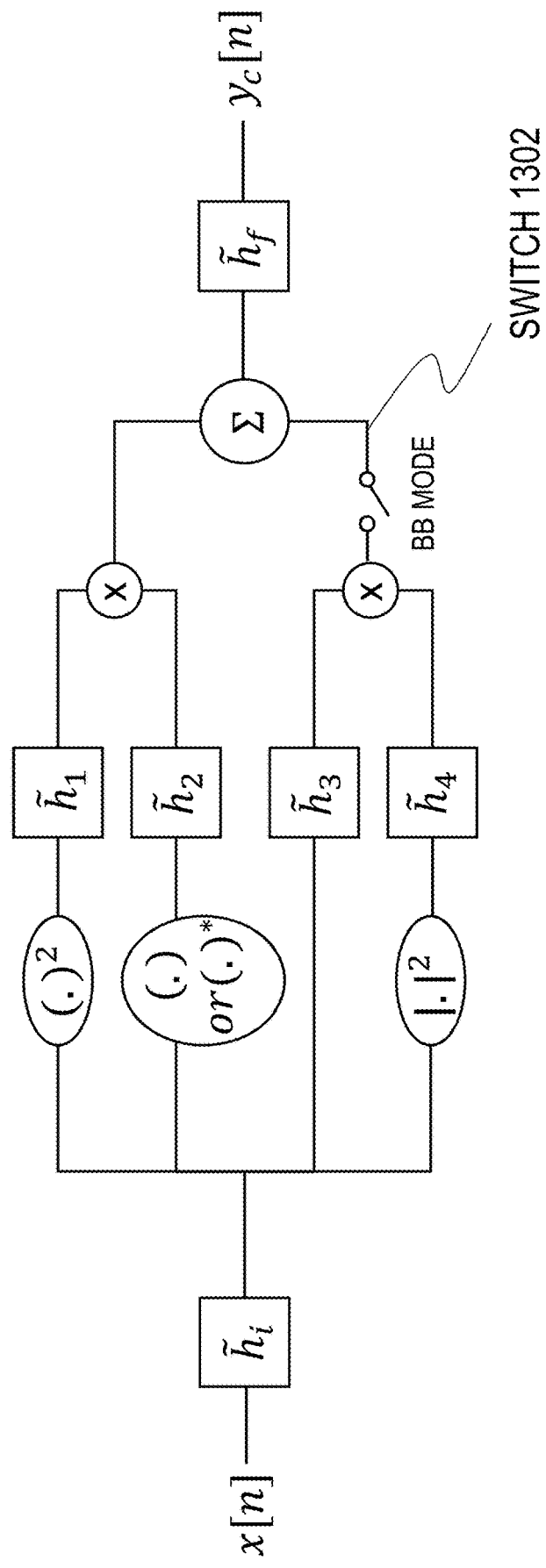
FIGS. 13A-B illustrate a passband equalizer and an equivalent complex baseband equalizer respectively, according to some embodiments of the disclosure.
Figure 13A:
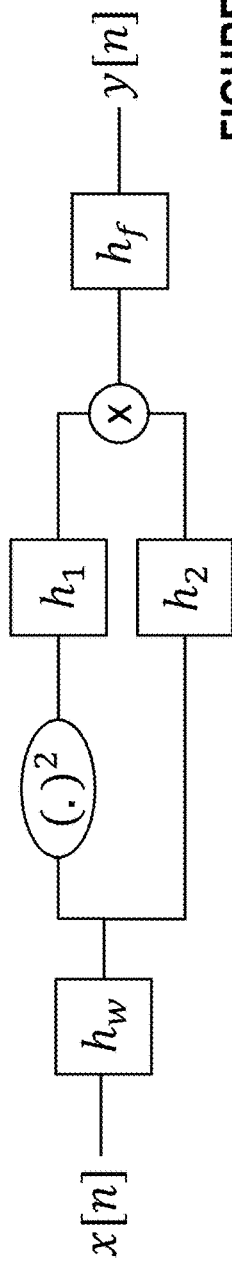
Figure 13B:
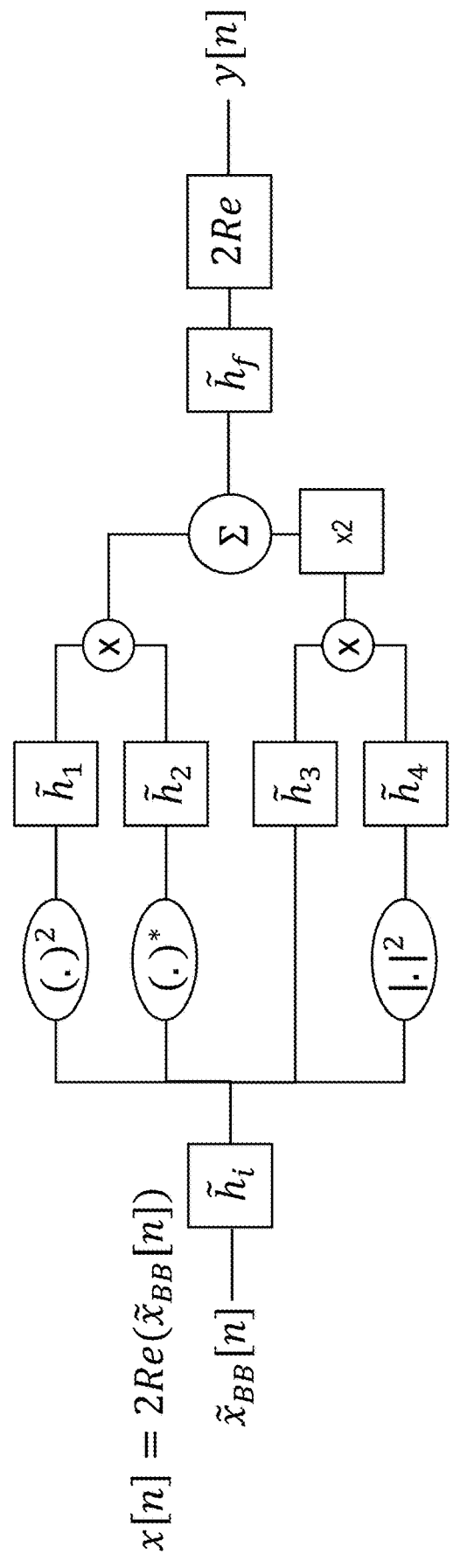
Figure 14:
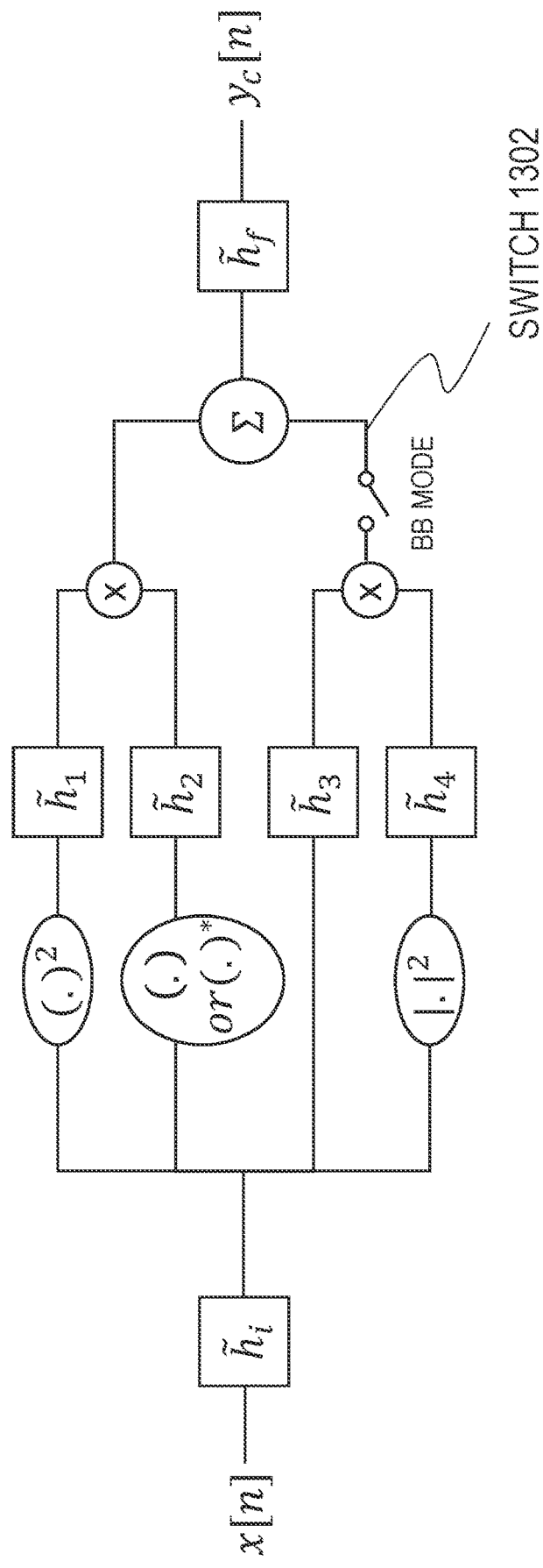
FIG. 14 illustrates a configurable equalizer having complex baseband mode and passband mode, according to some embodiments of the disclosure.

FIG. 13A illustrates a passband equalizer that operates on real passband signal. FIG. 13B illustrates a complex baseband equalizer that is equivalent to the equalizer in FIG. 13A. The complex baseband equalizer operates on complex baseband signals. FIG. 14 illustrates a configurable equalizer having complex baseband mode and passband mode, according to some embodiments of the disclosure. A switch 1302, controllable by signal "BB mode" can be included to allow for complex baseband mode processing or passband processing. When switch 1302 is open, one or more paths are disconnected from a combination network. Effectively, the equalizer operates in a passband mode. When switch 1302 is closed, all paths are connected to the combination network. Effectively, the equalizer operates in a complex baseband mode.

Variations and Implementations

There is a strong demand for linearity in the high end products such as Signal Intelligence (SIGINT) and spectrum/vector analysis. Advantageously, NLC can correct nonlinearities arising from receiver signal chain components including time-variant effects that are attributable to mixers. NLC involves a bank of parallel, cascaded nonlinearity correction calculators and NCOs to perform generic, wideband (>1 GHz) correction for modern RF-ADCs. It is not trivial to implement NLC that can operate robustly over the multi-GHz bandwidths of modern data-converters, in a reasonably area, and power efficient manner. NLC described herein, composed of an arrangement of filters, multipliers, and NCOs, achieves this ability by accounting for the physical nature of nonlinear spur generation in the architecture of our NLC implementation so that it is reasonable to implement in dedicated digital silicon in modern scaled complementary metal-oxide semiconductor processes.

To perform NLC effectively in receivers, using an extremely high-fidelity correction model can be beneficial (since compensation is achieved through subtractive cancellation). For any large enough blocker or combination of blockers across a receiver's bandwidth, the NLC capability preferably synthesizes the correct compensating response. Appropriate treatment of the nature of frequency dependence of a receive chain's spur generation may be desirable. Some implementations deal with this dependence in relatively limited ways that do not facilitate robust NLC. By contrast, the NLC solution described herein considers the system-to-be-compensated's NLTF, a fundamental physical property of a weakly nonlinear system, to motivate the architecture and topology of the equalizer. The architecture is unique because it uses a base-unit: a cascade of linear filters and signal transformations (functions/operations) in either the real or complex arithmetic domain (resembling a simple neural-network) that is specifically tailored for the nonlinearity generation mechanisms in receiver chains, thereby robustly matching the NLTF of the compensated device in a computationally efficient way. Connecting these base-units in parallel and mixing their input to appropriate frequencies can compensate a wide array of spurs that can arise in mixer-based receive chains.

Herein, "nonlinearities" and "non-idealities" are used interchangeably. Errors resulting from the nonlinearities can depend on input signal frequency, input signal amplitude, clock rate, temperature, voltage supply, etc.

The digital NLC techniques described herein may seem similar to digital pre-distortion schemes to achieve linearity of signal chain, but, the embodiments described herein for linearization are distinguishable from such schemes. Digital pre-distortion schemes pre-distort digital data that is being used to drive a signal chain to achieve linearity. These schemes typically would have knowledge of the input data into the signal chain (i.e., digital data as input to the signal chain), and pre-distort it based on an inverse of nonlinear functions of the signal chain to achieve linearity. In contrast, the embodiments described herein do not assume that there is any knowledge of the input signal (e.g., typically an unknown analog input signal being fed as input to the signal chain). Moreover, the embodiments described herein offer digital correction or analog tuning to correct and address the nonlinearities of the signal chain, which is not the same as pre-distorting a digital signal.

ADCs can be found in many places such as broadband communication systems, audio systems, receiver systems, etc. ADCs can translate analog electrical signals representing real-world phenomenon, e.g., light, sound, temperature, or pressure for data processing purposes. Designing an ADC is a non-trivial task because each application may have different needs in performance, power, cost, and size. ADCs are used in a broad range of applications including communications, energy, healthcare, instrumentation and measurement, motor and power control, industrial automation, and aerospace/defense.

In certain contexts, the features discussed herein can be applicable to converters being used in many different applications. The features described herein are particularly applicable to systems where performance (such as low power consumption and linearity) is important. Various exemplary applications include medical systems, scientific instrumentation, transportation systems, aerospace systems, wireless and wired communications, radar, industrial process control, audio and video equipment, consumer devices, and other converter-based systems.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

Parts of various apparatuses for digital NLC can include electronic circuitry to perform the functions described herein. In some cases, one or more parts of the apparatuses can be provided by an on-chip processor or controller specially configured for carrying out the functions described herein. For instance, the on-chip processor or controller may include one or more application specific components, or may include programmable logic gates which are configured to carry out the functions describe herein. The circuitry can operate in analog domain, digital domain, or in a mixed-signal domain (but preferably in the digital domain). In some instances, the processor or controller may be configured to carrying out the functions described herein by executing one or more instructions stored on a non-transitory computer medium accessible by the on-chip processor or controller.

In one example embodiment, the chip (or integrated circuit) having function blocks of the receiver signal chain and the on-chip processor may be provided on a board of an associated electronic device. The board can be a circuit board that can hold various components of the internal electronic system of the electronic device and, further, provide connectors for other peripherals. For instance, the chip having the converter and the on-chip processor can communicate with the components of the associated electronic device (e.g., signal generators, processors, memory, transmitters, receivers, etc.). More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, antennas, controllers for audio/video display, and peripheral devices may be attached to the board as plug-in cards, via cables, or integrated into the board itself.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the examples and appended claims. The specifications apply only to one nonlimiting example and, accordingly, they should be construed as such. In the foregoing description, example embodiments have been described with reference to particular processor and/or component arrangements. Various modifications and changes may be made to such embodiments without departing from the scope of the examples and appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the digital NLC functions, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

Selected Examples

Example 1 is a method for digital nonlinearity correction suitable for a receiver signal chain, comprising: injecting a probe signal to a node in a receiver signal chain that is upstream of at least one component in front of an ADC; and synthesizing, based on a digital output of the ADC generated in response to the probe signal being injected, a first linear filter, a second linear filter following a first function in a first path processing an output of the first linear filter, a third linear filter following a second function in a second path processing the output of the first linear filter, and a fourth linear filter to process a combination of outputs from the first path and the second path, wherein the first path and the second path are connected in parallel.

In Example 2, the method of Example 1 can optionally include wherein the probe signal being a three tone probe signal.

In Example 3, the method of Example 1 or 2, can optionally include wherein the probe signal has three or more greater number of tones.

In Example 4, the method of any one of Examples 1-3, can optionally include wherein the at least one component includes a low noise amplifier.

In Example 5, the method of any one of Examples 1-4, can optionally include the at least one component includes a mixer.

In Example 6, the method of any one of Examples 1-5, can optionally include wherein the at least one component includes a driver amplifier.

In Example 7, the method of any one of Examples 1-6, can optionally include wherein the at least one component includes a sample and hold circuit.

Example 101 is a method for digital nonlinearity correction suitable for a receiver signal chain, comprising: applying a first linear filter a digital output signal downstream of an analog-to-digital converter; in a first path, applying a first function to an output of the first filter; and applying a second linear filter to an output of the first function; in a second path, applying a second function to the output of the first filter; and applying a third linear filter to an output of the second function; combining at least outputs of the first path and the second path; applying a fourth linear filter to a combined output; and generating a first nonlinearity at the output of the fourth linear filter.

In Example 102, the method of Example 101, can optionally include: mixing, by a mixer, the digital output signal downstream of the ADC with an output from a numerically controlled oscillator before the first linear filter is applied.

In Example 103, the method of Example 101, can optionally include: upsampling the digital output signal downstream of the ADC.

In Example 103a, the method of Example 102, can optionally include: upsampling an output signal of the mixer.

In Example 104, the method of Example 101, can optionally include: upsampling the digital output signal downstream of the ADC by at least 3 times a bandwidth of a received signal digitized by the analog-to-digital converter.

In Example 105, the method of any one of Examples 101-103, can optionally include: interpolating an upsampled version of the digital output signal downstream of the ADC.

In Example 106, the method of any one of Examples 101-103, can optionally include: interpolating an upsampled version of the digital output signal of the ADC by bandpassing the upsampled output signal in a predetermined Nyquist zone.

In Example 107, the method of any one of Examples 101-106, can optionally include: filtering the combined outputs to remove out-of-band compensating spurs.

In Example 108, the method of any one of Examples 101-107, can optionally include: decimating the combined outputs.

In Example 109, the method of any one of Examples 101-108, can optionally include: upconverting the combined output.

In Example 110, the method of any one of Examples 101-109, can optionally include: low pass filtering the output of the second linear filter, wherein the first function includes a squaring function.

In Example 111, the method of any one of Examples 101-110, can optionally include: low pass filtering in the first path, wherein the first function in the first path includes a squaring function.

In Example 112, the method of any one of Examples 101-111, can optionally include: upsampling the digital output signal; and bandpass filtering the upsampled digital output signal according to a second Nyquist band.

In Example 113, the method of any one of Examples 101-112, can optionally include: combining the first nonlinearity with a second nonlinearity generated by further paths parallel to the first linear filter.

Example 1001 is a method for digital nonlinearity correction for a receiver signal chain, comprising: measuring nonlinearities of a receiver signal chain; synthesizing nonlinearities from the measured nonlinearities using parallel complex baseband equalizers; and cancelling the observed nonlinearities by subtracting the synthesized nonlinearities from a digital output signal of the receiver signal chain.

In Example 1002, the method of Example 1001, can optionally include: mixing the digital output signal in the receiver signal chain with an output of a numerically controlled oscillator to generate a complex baseband signal.

In Example 1003, the method of Example 1001 or 1001, can optionally include wherein synthesizing nonlinearities comprises: generating a first nonlinearity using a first complex baseband equalizer; generating a second nonlinearity using a second complex baseband equalizer that is parallel to the first complex baseband equalizer; and summing the first nonlinearity and second nonlinearity.

In Example 1004, the method of any one of Examples 1001-1003, can optionally include wherein measuring nonlinearities comprises: injecting a three tone probe signal in the receiver signal chain; and solving an optimization problem based on the probe signal and the digital output signal of the receiver signal chain when the probe signal is injected.

Example 10001 is a receiver signal chain with digital nonlinearity correction, comprising: one or more nonlinear components to process a received analog signal; an analog-to-digital converter to digitize the processed received analog signal; and a first branch comprising: a first linear filter to receive a digital output signal of the analog-to-digital converter; a first function to receive an output of the first filter; a second linear filter to receive an output of the first function; a second function to receive the output of the first filter; a third linear filter to receive an output of the second function; a combination network to receive and combine at least outputs of the second linear filter and the third linear filter; and a fourth linear filter to receive a combined output from the combination network and generate a first nonlinearity (e.g., associated with the one or more nonlinear components) at the output of the fourth linear filter.

In Example 10002, the receiver signal chain of Example 10001, can optionally include wherein the at least one component includes an LNA.

In Example 10003, the receiver signal chain of Example 10001 or 10002, can optionally include wherein the at least one component includes a mixer.

In Example 10004, the receiver signal chain of any one of Examples 10001-10003, can optionally include wherein the at least one component includes a driver amplifier.

In Example 10005, the receiver signal chain of any one of Examples 10001-10004, can optionally include wherein the at least one component includes a sample and hold circuit.

In Example 10006, the receiver signal chain of any one of Examples 10001-10005, can optionally include: a numerically controlled oscillator; and a mixer to mix the digital output signal of the ADC with an output from the numerically controlled oscillator before the first linear filter is applied.

In Example 10007, the receiver signal chain of any one of Examples 10001-10006, can optionally include: a low pass filter to receive the output of the second linear filter, wherein the first function includes a squaring function.

In Example 10008, the receiver signal chain of any one of Examples 10001-10006, can optionally include: wherein the first function includes a squaring function, and the second linear filter implements a low pass filter.

In Example 10009, the receiver signal chain of any one of Examples 10001-10008, can optionally include: upsampler to receive the digital output signal; and a bandpass filter to receive an output of the upsampler, wherein a passband of the bandpass filter is defined according to a second Nyquist band.

In Example 10010, the receiver signal chain of any one of Examples 10001-10009, can optionally include: a third function to receive an output of the first filter; a fourth linear filter to receive an output of the third function; a fourth function to receive the output of the first filter; a fifth linear filter to receive an output of the fourth function; wherein the combination network to receive and combine outputs of the second linear filter, the third linear filter, the fourth linear filter, and the fifth linear filter.

In Example 10011, the receiver signal chain of any one of Examples 10001-10010, can optionally include wherein the combination network includes a multiplier and a summer.

In Example 10012, the receiver signal chain of Example 10010 or 10011, can optionally include wherein: the first function comprises a squaring function; the second function comprises a conjugate function; the third function comprises a unity function; the fourth function comprises an absolute value function and a squaring function.

In Example 10013, the receiver signal chain of any one of Examples 10001-10012, can optionally include: a second branch having a network of cascaded function-filter paths to generate a second nonlinearity, wherein the second branch is parallel to the first branch, outputs of the first branch and the second branch are summed by a summer, and output of the summer is subtracted from the digital output signal of the analog-to-digital converter.

What is claimed in:

1. A method for digital nonlinearity correction suitable for a receiver signal chain, comprising:
    applying a first linear filter to a digital output signal downstream of an analog-to-digital converter (ADC);
    in a first path:
        applying a first function to an output of the first linear filter; and
        applying a second linear filter to an output of the first function;
    in a second path:
        applying a second function to the output of the first linear filter; and
        applying a third linear filter to an output of the second function;
    combining at least outputs of the first path and the second path to provide a combined output;
    applying a fourth linear filter to the combined output;
    generating a first nonlinearity at the output of the fourth linear filter; and
    filtering the combined output to remove out-of-band compensating spurs.

2. The method of claim 1, further comprising:
    mixing, by a mixer, the digital output signal downstream of the ADC with an output from a numerically controlled oscillator before the first linear filter is applied.

3. The method of claim 1, further comprising:
    before applying the first linear filter, upsampling the digital output signal downstream of the ADC by at least 3 times a bandwidth of a received signal digitized by the ADC.

4. The method of claim 1, further comprising:
    interpolating an upsampled version of the digital output signal downstream of the ADC by bandpassing the upsampled version of the digital output signal in a predetermined Nyquist zone.

5. The method of claim 1, further comprising:
    low pass filtering in the first path, wherein the first function in the first path includes a squaring function.

6. The method of claim 1, further comprising:
    combining the first nonlinearity with a second nonlinearity generated by further paths parallel to the first linear filter.

7. A receiver signal chain with digital nonlinearity correction, comprising:
    one or more nonlinear components to process a received analog signal;
    an analog-to-digital converter (ADC) to digitize the processed received analog signal; and
    a first branch comprising:
        a first linear filter to receive a digital output signal of the ADC;
        a first function to receive an output of the first linear filter;
        a second linear filter to receive an output of the first function;
        a second function to receive the output of the first linear filter;
        a third linear filter to receive an output of the second function;
        a combination network to receive and combine at least outputs of the second linear filter and the third linear filter to provide a combined output; and
        a fourth linear filter to receive the combined output from the combination network and generate a first nonlinearity at the output of the fourth linear filter.

8. The receiver signal chain of claim 7, further comprising:
    a numerically controlled oscillator; and
    a mixer to mix the digital output signal of the ADC with an output from the numerically controlled oscillator before the first linear filter is applied.

9. The receiver signal chain of claim 7, further comprising:
    a low pass filter to receive the output of the second linear filter, wherein the first function includes a squaring function.

10. The receiver signal chain of claim 7, wherein the first function includes a squaring function, and the second linear filter implements a low pass filter.

11. The receiver signal chain of claim 7, further comprising:
    upsampler to receive the digital output signal; and
    a bandpass filter to receive an output of the upsampler, wherein a passband of the bandpass filter is defined according to a second Nyquist band.

12. The receiver signal chain of claim 7, wherein the first branch further comprises,
    a third function to receive an output of the first linear filter;
    a fourth linear filter to receive an output of the third function;
    a fourth function to receive the output of the first linear filter; and
    wherein the combination network is configured to receive and combine outputs of the second linear filter, the third linear filter, the fourth linear filter, and the fifth linear filter to provide the combined output.

13. The receiver signal chain of claim 7, wherein the combination network includes a multiplier and a summer.

14. The receiver signal chain of claim 12, wherein:
the first function comprises a squaring function;
the second function comprises a conjugate function;
the third function comprises a unity function; and
the fourth function comprises an absolute value function and a squaring function.

15. The receiver signal chain of claim 7, further comprising:
a second branch having a network of cascaded function-filter paths to generate a second nonlinearity, wherein the second branch is parallel to the first branch, outputs of the first branch and the second branch are summed by a summer, and output of the summer is subtracted from the digital output signal of the ADC.

16. A method for digital nonlinearity correction suitable for a receiver signal chain, comprising:
applying a first linear filter to a digital output signal downstream of an analog-to-digital converter (ADC);
in a first path:
applying a first function to an output of the first linear filter; and
applying a second linear filter to an output of the first function;
in a second path:
applying a second function to the output of the first linear filter; and
applying a third linear filter to an output of the second function;
combining at least outputs of the first path and the second path to provide a combined output;
applying a fourth linear filter to the combined output;
generating a first nonlinearity at the output of the fourth linear filter; and
combining the first nonlinearity with a second nonlinearity generated by further paths parallel to the first linear filter.

* * * * *